United States Patent [19]

Sammarone

[11] 4,129,476

[45] Dec. 12, 1978

[54] ENVIRONMENT CONTROL SYSTEM

[75] Inventor: Dino G. Sammarone, Edgewood Borough, Pa.

[73] Assignee: The United States of America as representedby the United States Department of Energy, Washington, D.C.

[21] Appl. No.: 709,473

[22] Filed: Jul. 28, 1976

[51] Int. Cl.² .............................................. G21C 9/00
[52] U.S. Cl. ......................................... 176/37; 55/75; 176/87
[58] Field of Search ....................... 176/37, 38, 30, 31, 176/32, 87, 19; 55/75

[56] References Cited

FOREIGN PATENT DOCUMENTS 1807415 11/1968 Fed. Rep. of Germany ............. 176/37
2346726 3/1975 Fed. Rep. of Germany ............. 176/37

Primary Examiner—Samuel W. Engle
Assistant Examiner—Ralph Palo
Attorney, Agent, or Firm—Dean E. Carlson; Randall G. Erdley; C. L. McHale

[57] ABSTRACT

A system for controlling the environment of an enclosed area in nuclear reactor installations. The system permits the changing of the environment from nitrogen to air, or from air to nitrogen, without the release of any radioactivity or process gas to the outside atmosphere.

In changing from a nitrogen to an air environment, oxygen is inserted into the enclosed area at the same rate which the nitrogen-oxygen gas mixture is removed from the enclosed area. The nitrogen-oxygen gas mixture removed from the enclosed area is mixed with hydrogen, the hydrogen recombining with the oxygen present in the gas to form water. The water is then removed from the system and, if it contains any radioactive products, can be utilized to form concrete, which can then be transferred to a licensed burial site. The process gas is purified further by stripping it of carbon dioxide and then distilling it to remove any xenon, krypton, and other fission or non-condensable gases. The pure nitrogen is stored as either a cryogenic liquid or a gas.

In changing from an air to nitrogen environment, the gas is removed from the enclosed area, mixed with hydrogen to remove the oxygen present, dried, passed through adsorption beds to remove any fission gases, and reinserted into the enclosed area. Additionally, the nitrogen stored during the nitrogen to air change, is inserted into the enclosed area, the nitrogen from both sources being inserted into the enclosed area at the same rate as the removal of the gas from the containment area. As designed, the amount of nitrogen stored during the nitrogen to air change substantially equals that required to replace oxygen removed during an air to nitrogen change.

15 Claims, 3 Drawing Figures

ENVIRONMENT CONTROL SYSTEM

BACKGROUND OF THE INVENTION

This invention relates generally to nuclear reactors and more particularly to a system for controlling the environment of environmentally isolated areas in a nuclear reactor installation without the release of process gas or radioactivity to the external atmosphere.

A nuclear reactor produces heat by fissioning of nuclear materials which are fabricated into fuel elements and situated within a nuclear core. The nuclear core is located in a reactor vessel, and for safety considerations, the reactor vessel is frequently situated in an enclosed area which is situated in a containment building. The top of the vessel is sealed by a cover known generally as a head. Through this head pass numerous penetrations for the operation, control and surveillance of the reactor core and its attendant systems.

Power and supply equipment for the head penetrations are located above the pressure vessel and head. Additional machinery for the removal of the head, and fuel handling and transfer machinery are also located above the head. To prevent the escape of any radioactivity when refueling operations are being undertaken, this area is enclosed and shielded, and is known generally as the refueling hot cell.

During reactor operation, the environment in this hot cell may be either air or inert nitrogen. However, during refueling operations and fuel transfer, the environment is this hot cell must be an inert gas such as nitrogen. Conversely, during regular maintenance operations, the hot cell must have a breatheable atmosphere, mainly an air environment. Therefore, there are times when the environment in the refueling hot cell must be changed from air to nitrogen or from nitrogen to air.

Prior practice in the field when changing from an air to nitrogen environment has been to use a bleed and feed method. In this method, pure nitrogen is fed into the hot cell while a nitrogen rich air-nitrogen mixture is discharged from it. The bleed and feed method continues until the desired nitrogen concentration is reached. The reversed process is used when changing from nitrogen to air, with pure oxygen being fed into the cell while the nitrogen-oxygen is being discharged from it.

Shortcoming to this method, however, are that large amounts of bled gas are discharged to the environment and this gas can contain radioactive fission gases such as xenon and krypton. A once through gaseous radioactive waste disposal facility specifically for monitoring, processing, and removal of the fission gases from enclosed areas is seldom provided because of the required size and expense. The non-fission gases prochessed through such a facility, if it were used, would eventually be discharged to the atmosphere.

Environmentally and economically, this bleed and feed method is undesirable. Considerable quantities of nitrogen and oxygen are used in such procedure, and are expelled to the atmosphere during the changeover. Additionally, the discharge stream from gaseous radioactive waste disposal system may contain trace, but objectionable, amounts of radioactivity.

SUMMARY OF THE INVENTION

The aforementioned disadvantages of the prior art are eliminated by this system by providing a means by which the environment in an enclosed area can be changed from air to insert gas or inert gas to air without discharging gas or radioactivity to the external atmosphere. In changing from an inert gas to air environment, the gas discharged is mixed with hydrogen to remove any oxygen present in the discharge, this oxygen-hydrogen reaction product being removed from the system, the inert gas is separated from any other gases which may have been in the gas discharge, and is stored for a later use. During an air to inert gas change, the gas discharge containing oxygen is mixed with hydrogen, the hydrogen and oxygen forming water or steam, the water or steam being removed from the system, the inert gas is separated from fission or other gases present in the discharge stream, and the pure inert gas then is reinserted into the hot cell. During this changeover, the inert gas stored during an inert gas to air changeover is reinserted into the hot cell. The amount of inert gas stored during an inert gas to air change is substantially equal to the amount of inert gas necessary to replace the oxygen removed during an air to inert gas change.

BRIEF DESCRIPTION OF THE DRAWINGS

Reference is now made to the description of the preferred embodiment, taken in connection with the accompanying drawings, in which.

DESCRIPTION OF THE PREFERRED EMBODIMENT

Figure 1:
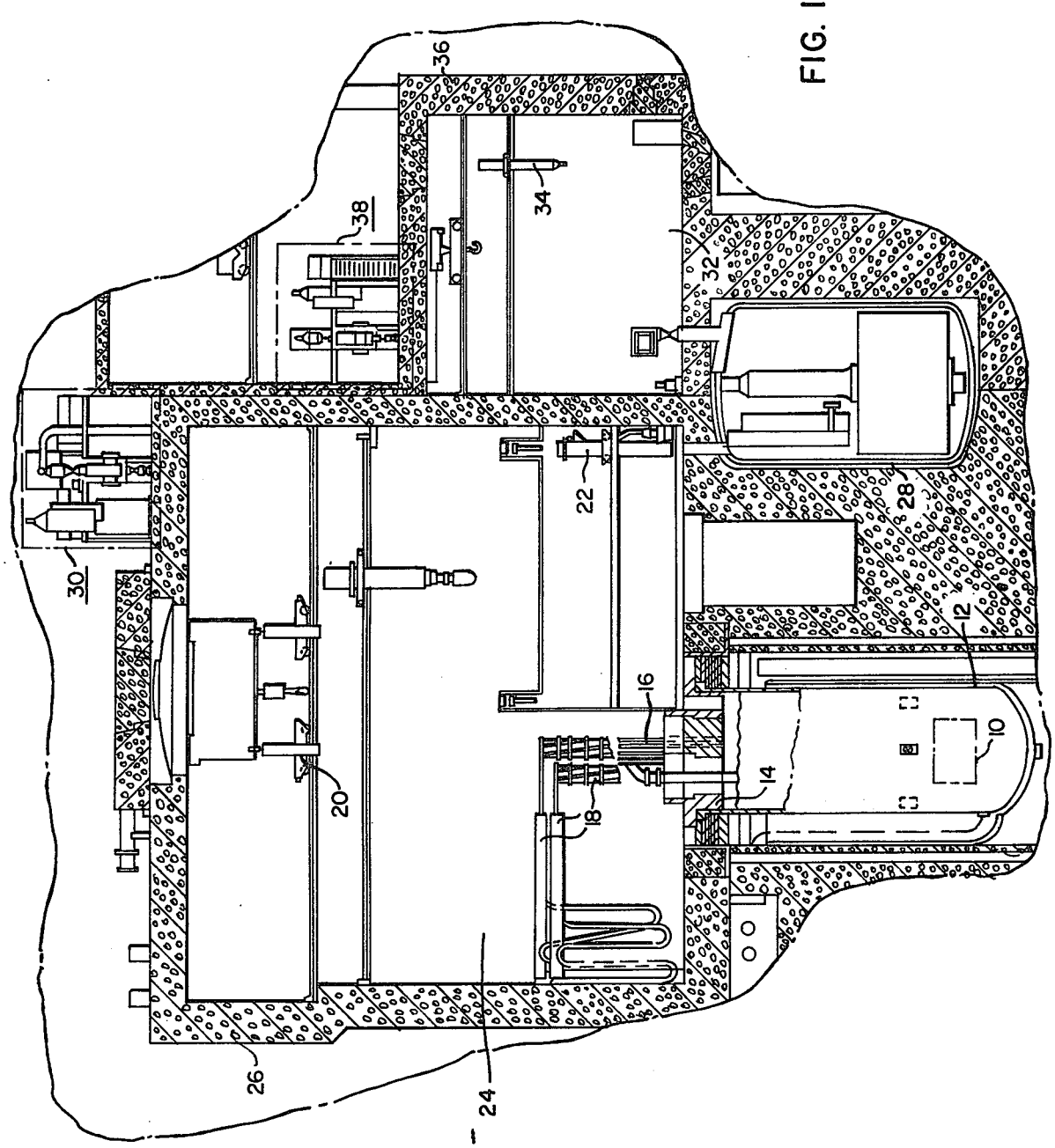
FIG. 1 is a typical arrangement of a nuclear reactor installation in which this invention may be practiced.

Throughout the description which follows, like characters indicate like elements for the various figures in the drawings.

FIG. 1 schematically illustrates a nuclear reactor installation in which this invention may be practiced. A nuclear core 10 is situated within a nuclear reactor vessel 12. The top of the nuclear reactor vessel 12 is sealed by a cover 14 known generally as a head. A plurality of penetrations 16 pass through this head 14 and into the reactor vessel 12 below. These penetrations 16 perform operational control, and surveillance functions in the reactor vessel 12 and the nuclear core 10. Connected to these penetrations 16 is auxiliary and supply equipment 18. Above the nuclear reactor vessel 12 and this head 14, heavy equipment 20 and transfer machines 22 are located. The auxiliary equipment 18, the heavy equipment 20, and the transfer machine 22 are located within an isolated enclosed area 24 bounded by a shield structure 26. The enclosed area 24 is known to those in the art as, among other designations, a refueling hot cell.

During nuclear reactor operations, the enclosed area 24 operates with either an inert gas or an air environment modes, depending upon the design requirements. During certain operations, the environment in this containment area 24 must be changed to either an air environment or an inert gas environment. For example, during maintenance operations on the auxiliary equipment 18, the transfer machine 22, or the heavy equipment 20, it would be desirable to have the environment in the enclosed area 24 be an air environment to avoid the use of life support systems for maintenance personnel. During fuel transfer operations, as when the fuel transfer machine 22 removes fuel elements (not shown)

from the nuclear core 10 to the fuel storage and transfer tank 28, the environment in the enclosed area 24 should be an inert gas. Although other inert gases such as argon may be used, the typical nuclear reactor installation preferably uses the less expensive nitrogen as the inert gas. Nitrogen mixed with oxygen approximates an air atmosphere for personnel employed in maintenance operations, whereas an argon-oxygen atmosphere may cause physiological effects on maintenance personnel. The environment control system 30 for changing the environment in the enclosed area 24 from air to nitrogen or nitrogen to air is shown located at the top of the shield structure 26. The location of this environment control system 30, however, can be anywhere external to the structure 26 wherever space permits.

In addition to the hot cell 24 above the nuclear reactor core 10 and the pressure vessel 12, another hot cell 32, smaller than the hot cell 24, is located above the fuel storage and transfer tank 28. The fuel in the fuel storage and transfer tank 28 must be removed from a nuclear reactor installation for processing and waste disposal. This is accomplished in the fuel service hot cell 32 by means of the fuel handling machine 34. The fuel handling machine 34 removes the fuel from the storage and transfer chamber 28, and delivers it, for example, to fuel shipping casks (not shown). The fuel service hot cell 32, is enclosed by another shield structure 36 which, although located adjacent to the hot cell 24, forms a separate enclosed area 32. As with the hot cell 24, the environment of the containment area 32 must be changed from air to nitrogen or from nitrogen to air. This change is accomplished by the environment control system 38 for the fuel service hot cell 32. Because it is desirable to be able to operate the hot cell 24 and the fuel service hot cell 32 independently of each other, the environment control systems 30 and 38 should be separate and distinct.

Figure 2:
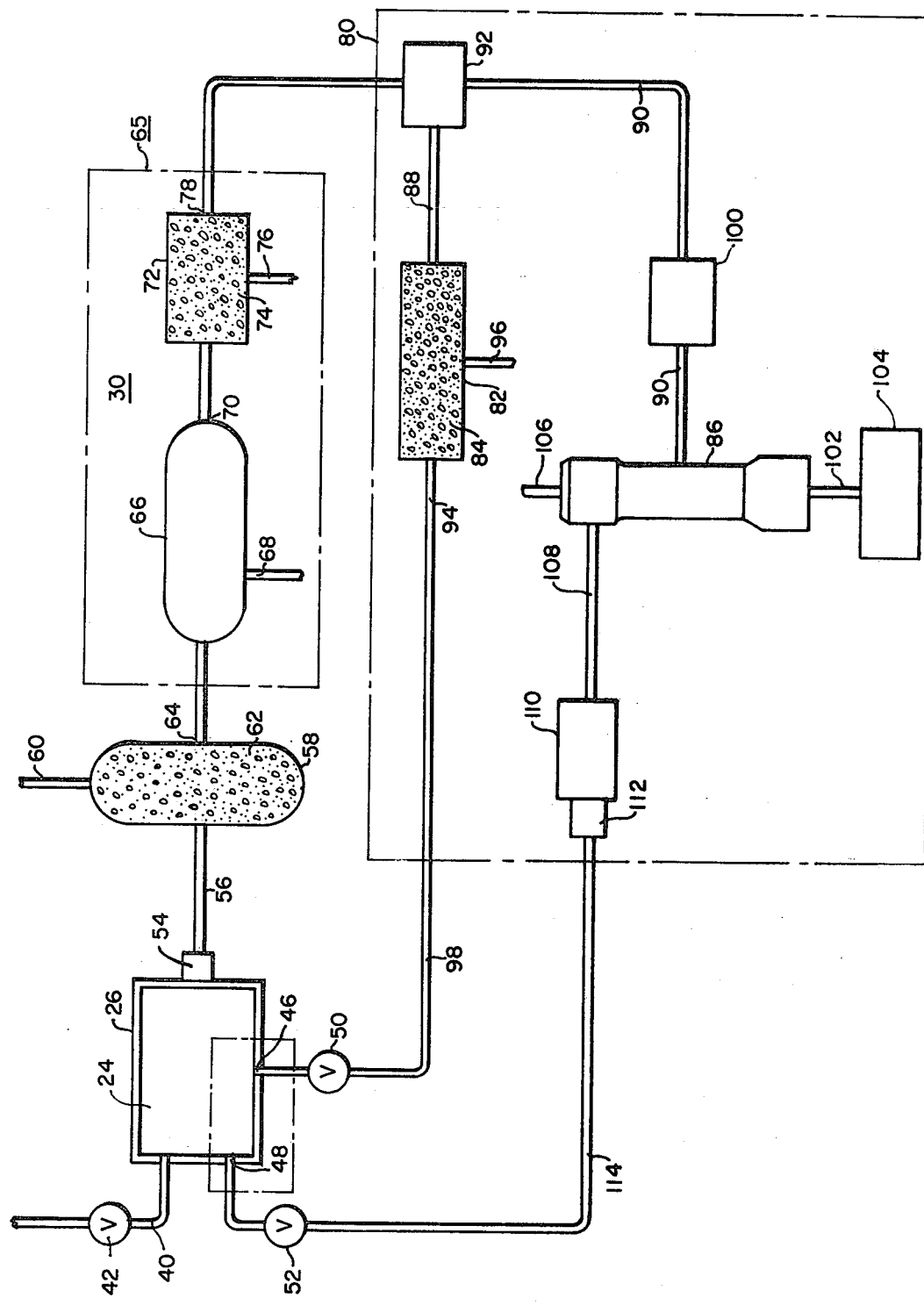
FIG. 2 is a diagrammatic illustration of the closed cycle environment control system.

FIG. 2 diagrammatically illustrates the environment control system 30 for the large refueling hot cell 24. Although the environment control system 30 for the large refueling hot cell 24 is illustrated, the invention is equally applicable to the environment control system 38 for the fuel service hot cell 32. Means for inserting oxygen 40 into the enclosed area 24 pass through the shield wall 26 and into the enclosed area 24. The oxygen which is inserted into the enclosed area 24 may be either pure oxygen, or air (a mixture of nitrogen and oxygen). The oxygen insertion means 40 contain control capability means 42, such as a valve, which either allow or prevent the oxygen from entering the enclosed area 24. Inert gas insertion means 44 also pass through the wall 26 and into the enclosed area 24. As heretofore mentioned, the inert gas will be assumed to be nitrogen, although another inert gas may be used. The nitrogen insertion means 44 comprises two inlets 46 and 48 which permit the nitrogen to enter the enclosed area 24. These two inlets 46 and 48 each have means 50 and 52 respectively, such as valves, to either permit or prevent the nitrogen from entering the enclosed area 24. Means 54, such as a gas pump, for removing the gas from the enclosed area 24 routes gas from the enclosed area 24 through the containment wall 26. The gas removal means 54 are connected via interconnecting piping 56 to a reaction vessel 58.

The reaction vessel 58, in addition to being connected to the gas removal means 54, is also connected to a hydrogen source 60. During operation, of the system 30, any oxygen present in the gas being removed from the enclosed area 24 entering the reaction vessel 58, is reacted with the hydrogen from the hydrogen source 60 to form a reaction product in the reaction vessel 58. This reaction product will be water, either in the liquid or gaseous state. The hydrogen-oxygen reaction can occur in the manner described in U.S. Patent application Ser. No. 387,418, filed Aug. 10, 1973 and assigned to the same assignee as the present invention. The remaining gas and the aqueous reaction product flow through the outlet means 64 of the reaction vessel 58 to a means 65 for removing the reaction product. This means 65 is comprised of a condenser 66 and a dryer 72. In the condenser 66, the gas and the reaction product is cooled, and condensed to its liquid state, exits through outlet means 68 at the bottom of the condenser 66. Outlet means 70 for the passage of gas, including any uncondensed gaseous reaction product, are connected to a dryer 72. In the dryer 72, a desiccating material 74, such as alumina, is present to remove reaction product which was not removed by the condenser 66. The reaction product, water, removed from the gas by the desiccating material 74, is periodically removed from the dryer 72 through the dryer outlet means 76. The gas which exits through the outlet means 78 of the dryer 72 is then basically the same as the gas removed from the enclosed area 24 minus any oxygen which may have been present in the gas in the enclosed area 24. The reaction vessel 58, the condenser 66, and the dryer 72, together comprise means for removing oxygen from the gas which has been removed from the enclosed area 24. Although illustrated as three separate elements, the reaction vessel 58, the condenser 66, and the dryer 72 can be combined in any manner which economics or commercial availability may dictate.

The gas outlet means 78 of the dryer 72 are connected to a means 80 for removing fission gases from the gas which was removed from the containment area 24. The nitrogen purification means 80 is comprised of two parallel purification means; an enclosure 82 containing an adsorption material 84; and a distillation column 86. The enclosure gas inlet means 88 and the distillation column gas inlet means 90 are coupled at 92 such that any gas exiting through the outlet means 78 of the dryer 72 can enter only one of the two parallel legs.

The enclosure 82 has gas inlet means 88 and gas outlet means 94. In the enclosure, and located between the inlet means 88 and the outlet means 94, as previously mentioned, is an adsorbent material 84 such as activated charcoal. The gas which enters through the inlet means 88 must pass through the adsorbent material 84 before it can exit the outlet means 94. The adsorbent material 84 removes any fission gas, such as krypton and xenon, from the gas passing through the enclosure 82. The fission gas can then be removed from the adsorbent material 84 through outlet means 96, and then either disposed of or stored. Means for supplying the gas which exits from the enclosure 82 to the insertion means 46, such as the piping 98, complete one leg of the parallel circuits.

The distillation column 86 has gas feed inlet means 90. This feed gas inlet means 90 has a means 100 such as a carbon dioxide trap, for removing any carbon dioxide which may be present in the gas entering the feed gas inlet means 90. After passing through the carbon dioxide trap 100, the gas enters the distillation column 86 proper. In the distillation column 86, the gas is cooled, and noble fission gases such as krypton and xenon are stripped by the refluxing nitrogen. These gases can then be removed through outlet means 102 to storage 104. The nitrogen which was in the gas removed from the enclosed area 24 rises to the top of the distillation column 86 and is there condensed. Non-condensable cases, such as helium, are then removed through outlet means 106. Exiting from the distillation column fluid outlet means 108, therefore, is pure liquid nitrogen. This liquid nitrogen is then stored in storage means 110. The nitrogen storage means 110 include regulation means 112 which regulate the amount of nitrogen which can exit from the storage means 110. Connecting the regulation means 112 of the storage means 110 and the nitrogen insertion means 48 are means for supplying this nitrogen such as piping 114. This parallel circuit is then completed.

The operation of the environment control system 30 varies according to whether the environment is to be changed from an air to an inert gas, or from inert gas to air. If it is desired to change from inert gas to air, the inert gas insertion means 46 and 48, and their associated gas flow prevention means 50 and 52 respectively, are closed. The oxygen insertion means 40, and its associated gas flow regulation means 42 are open. Oxygen is inserted into the enclosed area 24 at a rate substantially equal to the removal rate at which the gas, nitrogen, is being removed by the gas removal means 54. The gas in the enclosed area 24 is substantially comprised of nitrogen, with possible trace amounts of xenon, krypton, and helium. The gas removed from the enclosed area 24 is inserted into the reaction vessel 58. Hydrogen is also inserted into the reaction vessel 58 from the hydrogen source 60, and this hydrogen reacts with any oxygen present in the gas entering, to form a reaction product such as water or steam. The gas, and the water or steam, leaves the reaction vessel 58 through outlet means 64 and enters the condenser 66. There, this fluid mixture is condensed and cooled, and the reaction product (water) is removed through outlet means 68. The humid gas exits the condenser 66 through outlet 70, and enters the dryer 72. There, the gas passes through a dissicating material 74, the moisture is removed from the gas, and the dry gas exits through outlet means 78. The dissicant is periodically regenerated by isolating, and heating to remove adsorbed water through the reaction product outlet means 76. The gas then flows to the inert gas purification means 80. The coupling means 92 are positioned such that the gas exiting from the outlet means 78 of the dryer 72 flows into the distillation column gas feed inlet means 90.

After entering the distillation column gas feed inlet means 90, the gas passes through the carbon dioxide removal means 100, and any carbon dioxide present in the gas is removed. The gas then flows to the distillation column 86. There, the gas is cooled, noble fission gases such as xenon and krypton are stripped out by the distillation column 86. The fission gases are periodically removed from the distillation column 86 through removal means 102, and are either disposed of or stored in a storage container 104. The purified insert gas, nitrogen, rises to the top of the distillation column 86 and is condensed. Non-condensable gases, such as helium, are removed through outlet means 106. The condensed nitrogen, now in liquid form, flows from the distillation column 86 through an outlet means 108 to the storage means 110. The flow regulation means 112 are closed, and the nitrogen in the storage means 110 is stored until it is needed in an air to nitrogen changeover.

In an air to nitrogen environment changeover, the oxygen insertion means 40, are inoperative. The environment in the enclosed area 24, comprised mainly of nitrogen and oxygen, with possible trace amounts of xenon and krypton, is removed by removal means 54. As previously described, the oxygen is combined with hydrogen in the reaction vessel 58, and the reaction product is removed by the condenser 66 and the dryer 72. The gas exiting through the outlet means 78 of the dryer 72 then enters the inert gas separation means 80. The coupling means 92 are now positioned such that this gas enters the inlet means 88 of the enclosure 82. The gas enters the enclosure 82, passes through the adsorbed material 84, where the xenon and krypton is removed, and exits through the outlet means 94. The gases adsorbed by the adsorption material 84 are removed through the outlet means 96 and can then be disposed of or stored (not shown). The nitrogen exiting through the outlet means 94 then passes through supply means 98 to the insertion means 44, more particularly to an inert gas inlet 46. The gas flow prevention means 50 of the inlet 46 are open, permitting the nitrogen to enter the enclosed area 24.

During this changeover, the gas in the enclosed area 24 is removed from the enclosed area 24 by the gas removal means 54 at a constant removal rate. The amount of nitrogen inserted into enclosed area 24 through insertion means 44 is substantially equal to the removal rate. As the gas being removed by removal means 54 contains quantities of oxygen, in order to maintain a constant volume of gas in the enclosed area 24, additional nitrogen, other than that which is being reinserted through gas inlet 46, must be inserted into the enclosed area 24 by the insertion means 44. This additional nitrogen is obtained from the nitrogen stored in the storage means 110 during a nitrogen to air changeover. The regulating means 112 of the storage means 110 operate to allow enough nitrogen to exit from the storage means 110 such that the total amount of nitrogen entering the containment area 24 through the two outlets 46 and 48 substantially equals the amount of gas removed by removal means 54. During these changeovers, the amount of nitrogen stored in storage means 110 during a nitrogen to air changeover substantially equals the amount of nitrogen necessary to be inserted in the enclosed area 24 during an air to nitrogen changeover.

Figure 3:
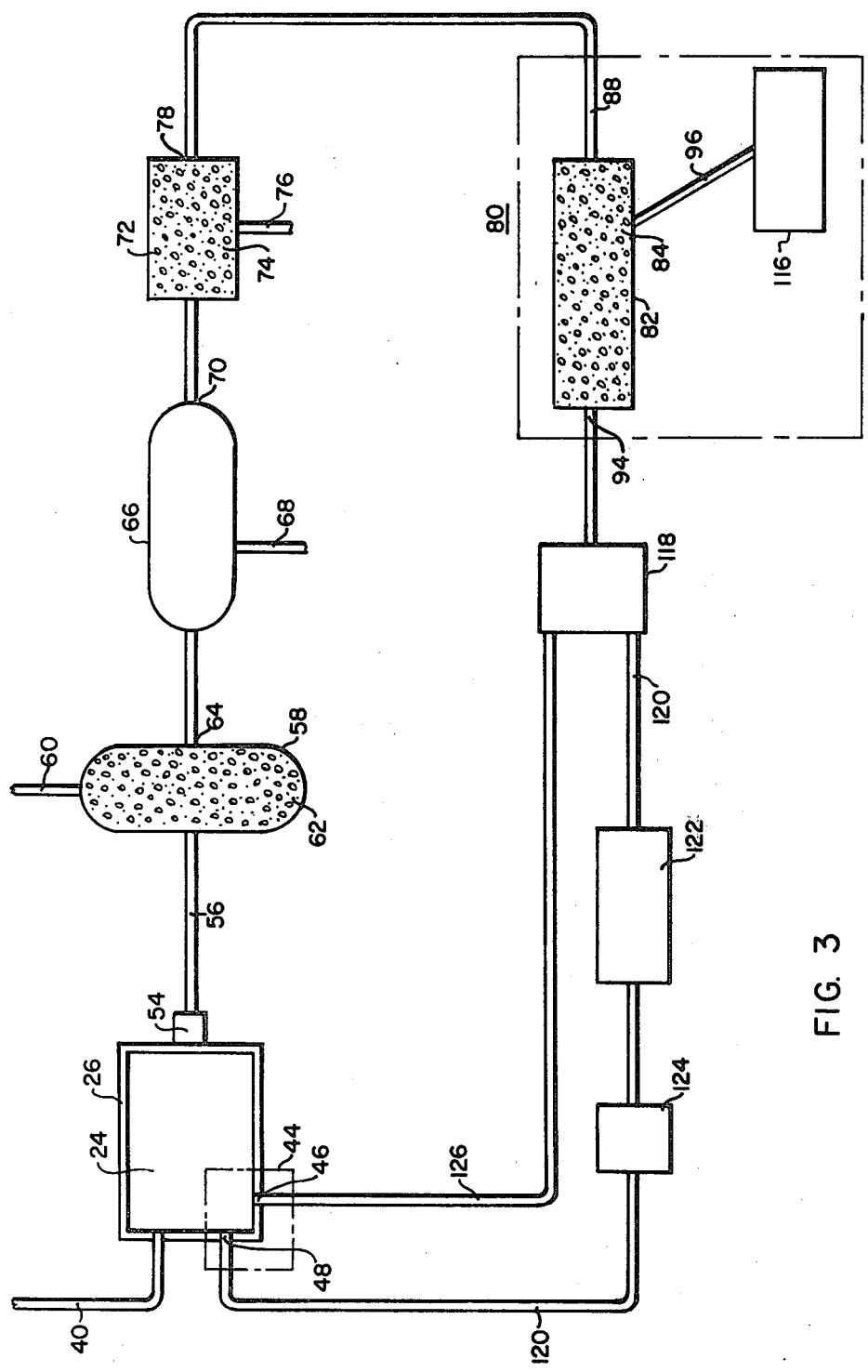
FIG. 3 is a modification of the system of FIG. 2.

FIG. 3 diagrammatically illustrates a modification of the environment control system 30 of FIG. 2. The enclosed area 24, with its associated inlets 46 and 48, oxygen insertion means 40, and gas removal means 54, are the same as in FIG. 2. Additionally, the reaction vessel 58, condenser 66, and the dryer 72, are the same. The gas exiting the outlet means 78 of the dryer 72 enters the inert gas separation means 80. The inert gas separation means 80 comprises the enclosure 82 containing an adsorbent material 84. Gas entering through the inlet means 88 of the enclosure 82 passes through the adsorbent material 84 and exits through the outlet means 94 of the enclosure 82. Any non-inert gases, such as xenon or krypton, are adsorbed by the adsorbent material 84, and removed from the enclosure 82 by outlet means 96, and are either disposed of or stored in storage means 116. From the outlet means 94 of the enclosure 82, the gas enters coupling means 118. The coupling means 118 permit the gas to flow to either of two parallel circuits. One parallel circuit comprises a first interconnecting means 126, such as piping, directly from the coupling means 118 to a gas flow inlet 46. The other circuit is comprised of a second interconnecting means 120 from the coupling means 118 to the other gas inlet 48. A gas storage means 122 is inserted into this second interconnecting means 120. In this storage means 122, the pure nitrogen is stored, either in a gaseous or in a liquid state. Also inserted into this second interconnecting means 120 are regulating means 124. These regulating means 124 regulate the amount of nitrogen which flows from the storage means 122 to the inlet means 48.

The operation of this modified system is similar to that of the system shown in FIG. 2. During a nitrogen to air changeover, the gas is removed from the enclosed area 24, flows to the reaction vessel 58 where it is combined with hydrogen from the hydrogen source 60. The reaction product is removed by the condenser 66 and the dryer 72, and flows to the inert gas purification means 80. The noble fission gases are removed by the adsorbent material 84 in the enclosure 82, and the inert gas flows to the coupling means 118. In this instance, the coupling means are positioned such that the inert gas flows to the second interconnecting means 120, and the nitrogen is stored in the storage means 122. During an air to nitrogen changeover, the coupling means 118 are positioned such that the gas exiting from the enclosure 82 flows through the first interconnecting means 126 directly to the containment area 24. Regulating means 124 permit enough nitrogen to exit from the storage means 122 such that the total of nitrogen entering through inlets 46 and 48 is substantially equal to the amount of gas exiting through removal means 54.

Sample calculations may contribute to a better understanding of the workings of this invention. The calculations will be made for the system as described in FIG. 2, although they are equally applicable to the system of FIG. 3. Two sample calculations follow, one for a nitrogen to air changeover and one for an air to nitrogen changeover. An assumption made in both of these calculations is that the volume of the enclosed area 24 is 200,000 cubic feet.

The first calculations will be for a nitrogen to air changeover. The basic equation is given by:

$$C_f/C_i = e^{-Ft/v} \quad (1)$$

wherein
- $C_f$ = Final concentration of $N_2$, in parts per million
- $C_i$ = Initial concentration of $N_2$, in parts per million
- $F$ = Removal rate through means 54, in standard cubic feet per minute. This is also the oxygen insertion rate through means 40.
- $V$ = Volume of enclosed area 24, in cubic feet.
- $t$ = Time, in minutes The removal rate, F, is dependent upon the design of the removal means 54, and for this example will be assumed to be 3200 standard ft³/min. The initial concentration of nitrogen, $C_i$, is $100 \times 10^4$ PPM. The final concentration of nitrogen, $C_f$, is $79 \times 10^4$ PPM. (This is based on the assumption that the composition of air is 79% nitrogen and 21% oxygen). As heretofore mentioned, the volume of the enclosed area 24 is 200,000 ft³. Substituting these values into equation (1), $$\frac{79 \times 10^4}{100 \times 10^4} = e^{-\frac{3200\, t}{2 \times 10^5}}$$

$$0.79 = e^{-0.016\, t}$$

$$\ln 0.79 = -0.016\, t$$

$$t = -\frac{\ln 0.79}{0.016} = 14.73 \text{ min.}$$

Thus, the gas in enclosed area 24 will be removed at a rate of 3200 ft³/min. for a time of 14.73 minutes. But this is also the amount of oxygen which will be inserted into the containment area 24. Thus the total amount of oxygen is $T_{O_2} = Ft = 3200 \times 14.73 = 47,136$ ft³. But only 42,000 ft³ (21% $\times$ 200,000) of oxygen is used to replace the removed nitrogen. The excess 5,136 ft³ of oxygen is mixed with 10,272 ft³ of hydrogen in the reaction vessel 58. The reaction product formed is 515.6 pounds of water and steam. This water and steam is removed by the condenser 66 and the dryer 72 as 62 gallons of water. This water, if radioactive, can be used to prepare concrete for shipment to a licensed burial site.

The 42,000 ft³ of nitrogen exiting from the dryer 72 enters the column gas inlet means 90 through coupling means 92. Any $CO_2$ present is removed in carbon dioxide removal means 100, xenon and krypton are removed in the distillation column 86, and after condensation, 60.5 ft³ of liquid nitrogen exits through column fluid outlet means 108 to be stored in storage means 110. The liquid nitrogen will be stored until needed in an air to nitrogen changeover.

The second sample calculation is for an air to nitrogen changeover. The basic equation is:

$$C_f/C_i = e^{-Ft/v} \quad (2)$$

wherein
- $C_f$ = Final concentration of $O_2$, in parts per million
- $C_i$ = Initial concentration of $O_2$, in parts per million
- $F$ = Removal rate through means 54, in standard cubic feet per minute. This is also the nitrogen insertion rate through means 44, which is equal to the sum of the flow entering inlets 46 and 48.
- $V$ = Volume of enclosed area 24, in cubic feet
- $t$ = Time, in minutes The removal rate, F, will again be assumed to be 3200 ft³/min. The initial concentration of oxygen is $21 \times 10^4$ PPM. The final concentration of oxygen, although theoretically zero, will, for practical considerations be assumed to be $10^3$ PPM. The volume is 200,000 ft³. Substituting those values into equation (2), $$\frac{10^3}{2.1 \times 10^5} = e^{-\frac{3200\, t}{2 \times 10^5}}$$

$$\frac{2.1 \times 10^5}{10^3} = e^{+\frac{3200\, t}{2 \times 10^5}}$$

$$\ln 210 = \frac{3200\, t}{2 \times 10^5}$$

$$t = \frac{2 \times 10^5 \ln 210}{0.032 \times 10^5} = \frac{2 \ln 210}{0.032}$$

$$t = 334.2 \text{ minutes}$$

Thus, the amount of nitrogen to be recirculated is:

$$TN_2 = Ft = 3200 \times 334.2 = 1,069,422 \text{ ft}^3$$

Of this amount, 42,000 ft³, the amount of nitrogen needed to replace the oxygen removed, is obtained from the substantially equal amount stored during the nitrogen to air changeover. The remaining 1,027,422 ft$^3$ of nitrogen is obtained by recirculating the nitrogen already in the enclosed area 24 a number of times (approximately 5).

At the start of the changeover, the nitrogen entering this enclosed area 24 through inlet 48 from storage is equal the removal rate, 3200 ft$^3$/min. However, once nitrogen begins to enter through the inlet 46, the stored nitrogen insertion rate is lowered so that the total nitrogen insertion rate from both inlets 46 and 48 equals the removal rate.

The oxygen removed from the enclosed area 24 is combined with 84,000 ft$^3$ of hydrogen in the reaction vessel 58. The reaction product formed is 4212 pounds of water and steam. This water and steam is removed by the condenser 66 and the dryer 72 as 506 gallons of water, to be made into concrete and buried.

Thus, it can be seen that this invention provides a means for changing the environment in a containment area without the release of radioactivity or gas to the external atmosphere, and which does not expend large amounts of oxygen and nitrogen, providing an environmentally desirable manner of accomplishing the changeover.

I claim as my invention:

1. A system for controlling the environment of an enclosed area in a nuclear reactor installation comprising:

an enclosed area containing a gas, said area being enclosed by a plurality of walls;

means extending through one of said walls for inserting oxygen into said enclosed area;

means extending through one of said walls for inserting an inert gas into said enclosed area;

means extending through one of said walls for removing said gas from said enclosed area;

means interconnected with said enclosed gas removing means for removing oxygen from said gas removed from said enclosed area, said gas passing from said enclosed gas removing means to said oxygen removing means;

means interconnected with said oxygen removing means for purifying the gas removed from said oxygen removing means, said gas passing from said oxygen removing means to said purifying means; and means interconnected with said purifying means for supplying said purified gas from said purifying means to said means for inserting an inert gas into said enclosed area, whereby the gas removed from said enclosed area has removed therefrom any oxygen it contains, is purified and is capable of being reinserted into said enclosed area as said inert gas.

2. The system according to claim 1 wherein said means for inserting oxygen to said enclosed area includes air containing oxygen.

3. The system according to claim 1 wherein said means for inserting oxygen into said enclosed area includes oxygen in its substantially pure state.

4. The system according to claim 1 wherein said inert gas is nitrogen gas.

5. The system according to claim 4 wherein said means for removing oxygen from said gas removed from said enclosed area comprises:

a reaction vessel having reaction vessel inlet means and reaction vessel outlet means, said gas removed from said enclosed area entering said reaction vessel inlet means;

a source of hydrogen gas, said hydrogen gas being inserted into said reaction vessel; and means for achieving the chemical reaction of said hydrogen gas with any oxygen present in said gas removed from said enclosed area in said vessel to form a reaction product.

6. The system according to claim 5 wherein said means for removing oxygen from said gas removed from said enclosed area further comprises means for removing said reaction product formed by the chemical reaction of said hydrogen gas with said oxygen from said gas removed from said enclosed area.

7. The system according to claim 6 wherein said means for removing said reaction product includes;

a condenser connected to said reaction vessel outlet means, said condenser having inlet means, outlet means for the removal of said reaction product and outlet means for the passage of said gas removed from the said enclosed area, said gas passing from said reaction vessel to said condenser; and a dryer connected to said outlet means for the passage of said gas removed from said enclosed area of said condenser, said dryer containing a desiccating material to remove said reaction product, said dryer having outlet means for the passage of said gas removed from said enclosed area, said dryer havng outlet means for the removal of said reaction product, said gas passing from said condenser gas outlet means to said dryer.

8. The system according to claim 7 wherein said means for purifying said inert gas from said gas removed from said enclosed area positioned such that gas exiting from said dryer gas outlet means enters said means for purifying said inert gas.

9. The system according to claim 8 wherein said means for inserting inert gas into said enclosed area includes at least two inlets into said enclosed area through which said inert gas flows, said inlets each having means for preventing said inert gas from being inserted into said enclosed area.

10. The system according to claim 9 wherein said means for supplying said purified gas to said means for inserting an inert gas into said enclosed area comprises;

a first means for interconnecting one of said inlets into said enclosed area to said means for purifying said inert gas; and a second means for interconnecting the other of said inlets into said enclosed area to said means for purifying said inert gas, said second means for interconnecting including means for storing said gas, said second means for interconnecting including means for regulating the quantity of inert gas flowing to said inlet into said enclosed area associated therewith, said first and said second means for interconnecting being coupled such that said gas exiting from said purifying means can flow through only one of said means for interconnecting at a time.

11. The system according to claim 10 wherein said purifying means comprises an enclosure, said enclosure containing an adsorbent material.

12. The system according to claim 9 wherein said purifying means comprises;

an enclosure containing an adsorbent material, said enclosure having gas inlet means interconnected with said dryer gas outlet means and gas outlet means, said adsorbent material being positioned between said enclosure gas inlet means and said enclosure gas outlet means, said adsorbent material permitting said gas to flow from said enclosure gas inlet means to said enclosure gas outlet means, said enclosure gas outlet means interconnected with and supplying said gas to one of said inlets into said enclosed area through said means for supplying said purified gas associated therewith, and a distillation column having gas feed inlet means interconnected with said dryer gas outlet means and fluid outlet means, said gas feed inlet means having means for removing carbon dioxide from said gas entering said gas feed inlet means, said distillation column permitting said inert gas to flow from said gas feed inlet means to said column fluid outlet means, said column fluid outlet having means for storing said inert gas, said means for storing said inert gas having means for regulating the flow of said inert gas to said means for supplying said purified gas to said means for inserting said inert gas into said enclosed area, said means for supplying said purified gas associated therewith being connected to one of said inlets into said enclosed area, said enclosure gas inlet means and said gas feed inlet means being coupled such that gas exiting from said dryer gas outlet means can enter only one of said means at a time.

13. The system according to claim 12 wherein said adsorbent material is activated charcoal.

14. The system according to claim 12 wherein said gas in said enclosed area is initially comprised substantially of inert nitrogen, said means for removing said gas from said enclosed area removing said gas at a constant removal rate, said means for inserting oxygen into said enclosed area inserting said oxygen at a constant oxygen insertion rate substantially equal to said removal rate, said gas exiting from said dryer gas outlet means entering said distillation column gas feed inlet means, said means for storing said inert gas storing substantially all of said inert gas; and said means for preventing said inert gas from being inserted into said enclosed area of said inlets into said enclosed area preventing said inert gas being inserted into said enclosed area.

15. The system according to claim 12 wherein said gas in said enclosed area is initially comprises substantially of inert nitrogen and oxygen, said means for removing said gas from said enclosed area removing said gas at a constant removal rate, said means for inserting oxygen into said enclosed area being inoperative, said gas exiting from said dryer gas outlet means entering said enclosure gas inlet means; and, said means for inserting an inert gas into said enclosed area inserting said inert gas at a constant inert gas insertion rate substantially equal to said removal rate.

* * * * *